United States Patent
Kim et al.

(10) Patent No.: US 7,864,730 B2
(45) Date of Patent: Jan. 4, 2011

(54) METHOD FOR CONTROLLING MULTI-MODE MULTI-BAND MOBILE COMMUNICATION TERMINAL FOR HAND-OVER BETWEEN ASYNCHRONOUS COMMUNICATION NETWORK AND SYNCHRONOUS COMMUNICATION NETWORK AND MOBILE COMMUNICATION SYSTEM THEREFOR

(75) Inventors: Young-Lak Kim, Yongin-si (KR);
Sung-Ho Shin, Seoul (KR);
Hyun-Wook Kim, Seongnam-si (KR);
Jong-Tae Ihm, Seongnam-si (KR)

(73) Assignee: SK Telecom Co. Ltd., Seoul (KR)

( * ) Notice: Subject to any disclaimer, the term of this patent is extended or adjusted under 35 U.S.C. 154(b) by 986 days.

(21) Appl. No.: 10/585,302

(22) PCT Filed: Jan. 6, 2005

(86) PCT No.: PCT/KR2005/000029

§ 371 (c)(1),
(2), (4) Date: Jan. 19, 2007

(87) PCT Pub. No.: WO2005/067177

PCT Pub. Date: Jul. 21, 2005

(65) Prior Publication Data

US 2008/0056190 A1   Mar. 6, 2008

(30) Foreign Application Priority Data

Jan. 6, 2004   (KR) ............... 10-2004-0000715
Jan. 27, 2004  (KR) ............... 10-2004-0005145

(51) Int. Cl.
*H04Q 7/00* (2006.01)
(52) U.S. Cl. .............. 370/331; 370/328; 370/329; 370/338; 370/352

(58) Field of Classification Search ......... 370/319–335; 455/432.1–453
See application file for complete search history.

(56) References Cited

U.S. PATENT DOCUMENTS

| 6,070,075 | A | 5/2000 | Kim |
| 6,456,858 | B1 * | 9/2002 | Streter .................... 455/552.1 |
| 6,704,581 | B1 * | 3/2004 | Park et al. ................ 455/553.1 |
| 2002/0051432 | A1 | 5/2002 | Shin |
| 2002/0061749 | A1 | 5/2002 | Hunzinger |
| 2005/0043046 | A1 * | 2/2005 | Lee ........................... 455/502 |

FOREIGN PATENT DOCUMENTS

| JP | 2001-186552 | 7/2001 |
| WO | 03/079716 | 9/2003 |

OTHER PUBLICATIONS

International Search Report dated Apr. 19, 2005 for PCT/KR2005/000029.

* cited by examiner

*Primary Examiner*—Dai A Phuong
(74) *Attorney, Agent, or Firm*—Lowe Hauptman Ham & Berner LLP

(57) ABSTRACT

The present invention relates to a method of controlling a mobile communication terminal and mobile communication system therefor. In the mobile communication terminal control method, a synchronous base station of a synchronous area placed at the boundary region of an asynchronous area transmits a dummy pilot signal at the same frequency as that of a signal used in the asynchronous mobile communication system and drives a synchronous modem unit of the mobile communication terminal moving from the asynchronous area to the synchronous area. A handover cell is constructed at the boundary between synchronous and asynchronous areas, and a handover base station in the handover cell transmits a signal including system information at the same frequency as that of a signal used in the asynchronous mobile communication system, thus driving the synchronous modem unit of the mobile communication terminal entering the handover cell.

12 Claims, 9 Drawing Sheets

METHOD FOR CONTROLLING MULTI-MODE MULTI-BAND MOBILE COMMUNICATION TERMINAL FOR HAND-OVER BETWEEN ASYNCHRONOUS COMMUNICATION NETWORK AND SYNCHRONOUS COMMUNICATION NETWORK AND MOBILE COMMUNICATION SYSTEM THEREFOR

CROSS REFERENCE TO RELATED APPLICATION

This application is the National Phase application of International Application No. PCT/KR2005/000029, filed Jan. 6, 2005, which designates the United States and was published in English. This application, in its entirety, is incorporated herein by reference.

TECHNICAL FIELD

The present invention relates, in general, to a method of controlling a mobile communication terminal and, more particularly, to a method of controlling a mobile communication terminal and mobile communication system therefor, which drives a modem of a multi-mode multi-band mobile communication terminal using a signal having the same frequency as an asynchronous signal when handover between asynchronous and synchronous networks is performed.

BACKGROUND ART

With the development of mobile communication technology and tie progress of communication networks, various types of mobile communication systems have been developed. Further, International Mobile Telecommunications (IMT)-2000 systems have been developed to solve a global roaming problem between mobile communication systems caused by the development of various types of mobile communication systems. IMT-2000 systems are classified into a Code Division Multiple Access (CDMA) 2000-based synchronous mode system and a Wideband CDMA (WCDMA)-based asynchronous mode system.

Further, a mobile communication terminal (multi-mode multi-band terminal) capable of being used in both synchronous and asynchronous mode systems has been developed so as to support global roaming between mobile communication systems. By using such a mobile communication terminal, different types of services can be used in an asynchronous mode system area and a synchronous mode system area.

Currently, an asynchronous mobile communication system is being constructed in areas having a great number of service requests, so that a synchronous mode mobile communication system has been developed into a form in which a service area thereof includes service areas of an asynchronous mode system. During this process, when a user moves between an asynchronous mobile communication system and a synchronous mobile communication system, handover between the systems is required to provide continuous service.

For handover from the asynchronous mobile communication system to the synchronous mobile communication system, it is important to effectively detect a signal of the synchronous mobile communication system during the use of service provided by the asynchronous mobile communication system. For this operation, in order to perform handover, a multi-mode multi-band mobile communication terminal must drive a modem to interface with the synchronous mobile communication system while using the service provided by the asynchronous mobile communication system and must search for a cell in which to perform handover.

However, since the asynchronous and synchronous mobile communication systems use different communication methods, it is very difficult to implement handover between systems, and there is a limitation in increasing the probability of successful handover using only handover methods that have been proposed. Further, since a multi-mode multi-band mobile communication terminal is provided with two modems, it is greatly important to determine time points at which the two modems are to be driven or turned off.

In detail, a multi-mode multi-band mobile communication terminal requires handover during the use of service provided by an asynchronous mobile communication system, requires a time of about 10 seconds to drive a synchronous modem unit used to communicate with a synchronous mobile communication system, and must drive the synchronous modem unit before communication with the asynchronous mobile communication system is interrupted. There are disadvantages in that, if the synchronous modem unit is not driven before the multi-mode multi-band mobile communication terminal completely leaves an asynchronous mobile communication system area, handover is not successfully performed and a call is interrupted, while if the synchronous modem unit is driven unnecessarily early, two modems are simultaneously turned on, so that power consumption is increased. In this way, since the time point at which the synchronous modem unit is to be driven cannot be exactly known, problems, such as communication interruption occurring at the time of handover and increased power consumption, occur.

As described above, research into a method of controlling a multi-mode multi-band mobile communication terminal when performing handover is currently insufficient, so that there are disadvantages in that it is difficult to provide continuous service and the time required for the handover is greatly increased at the time of handover from an asynchronous mobile communication system to a synchronous mobile communication system.

DISCLOSURE OF THE INVENTION

Accordingly, the present invention has been made keeping in mind the above problems, and an object of the present invention is to provide a method of controlling a multi-mode multi-band mobile communication terminal and mobile communication system therefor, which drives a synchronous modem of the multi-mode multi-band mobile communication terminal using a signal having the same frequency as a signal used in an asynchronous mobile communication system, when handover between the asynchronous mobile communication and the synchronous mobile communication system occurs, thus preventing communication interruption from occurring at the time of handover and consequently providing continuous service.

BEST MODE FOR CARRYING OUT THE INVENTION

Figure 1:
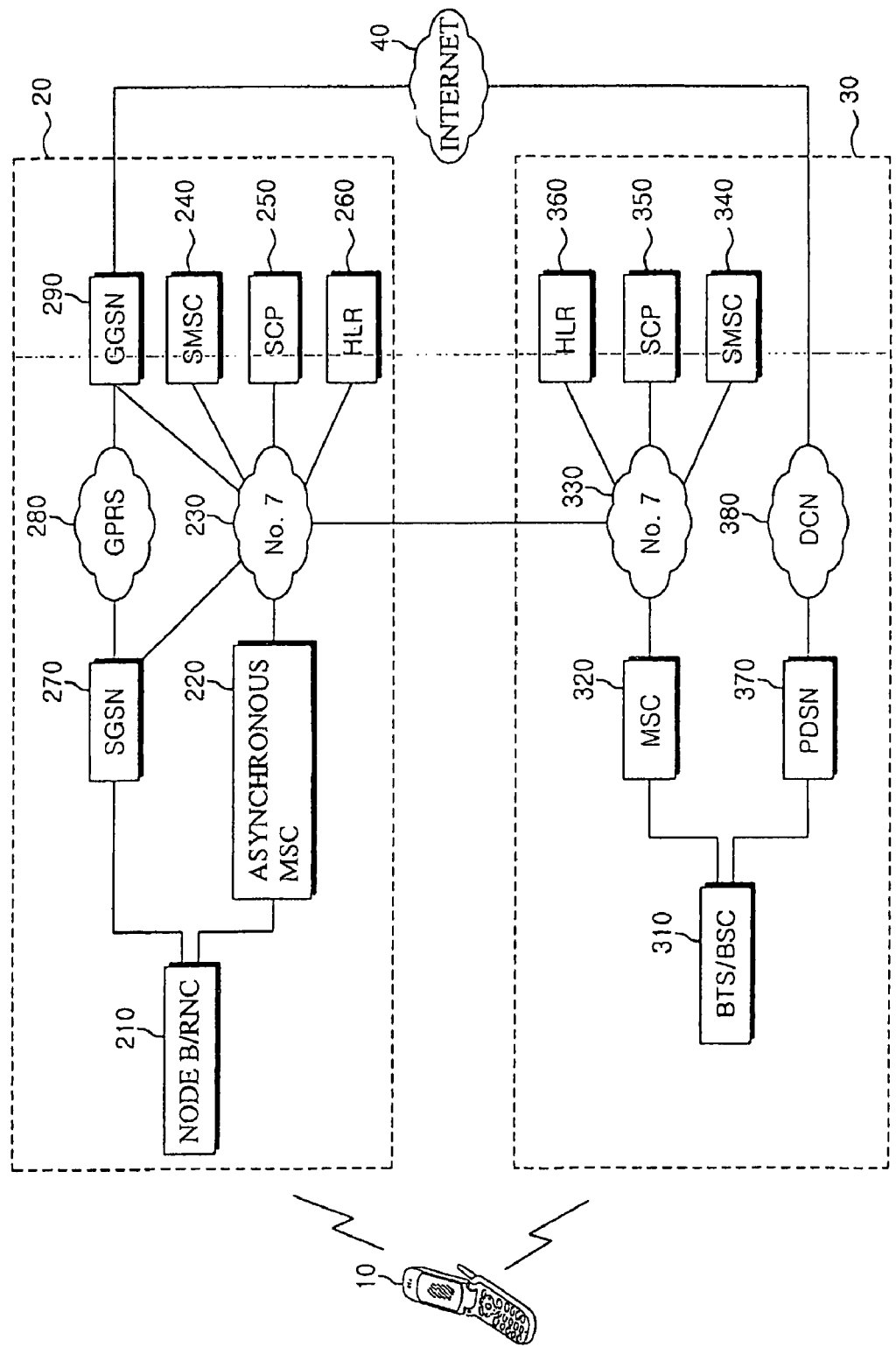
FIG. 1 is a view showing the configuration of a mobile communication network to which the present invention is applied.

In order to accomplish the above object, the present invention provides a method of controlling a multi-mode multi-band mobile communication terminal for handover, the multi-mode multi-band mobile communication terminal being provided with an asynchronous modem unit and a synchronous modem unit and being capable of receiving signals from a synchronous mobile communication system during use of service provided by an asynchronous mobile communication system in a mobile communication network in which the asynchronous and synchronous mobile communication systems coexist, the method comprising the first step of, as the mobile communication terminal using the service provided by the asynchronous mobile communication system moves into a synchronous area, the asynchronous modem unit of the mobile communication terminal receiving a dummy pilot signal from the synchronous mobile communication system, driving the synchronous modem unit of the mobile communication terminal, searching for a cell in which to perform handover, notifying the asynchronous mobile communication system of results of a search for a cell in which to perform handover, and transmitting a channel assignment message to the synchronous modem unit when a handover command has been received from the asynchronous mobile communication system; the second step of switching a vocoder and turning off the asynchronous modem unit; and the third step of the synchronous modem unit achieving synchronization with the synchronous mobile communication system.

Further, the present invention provides a method of controlling a multi-mode multi-band mobile communication terminal for handover, the multi-mode multi-band mobile communication terminal being provided with an asynchronous modem unit and a synchronous modem unit and being capable of receiving signals from a synchronous mobile communication system during use of service provided by an asynchronous mobile communication system in a mobile communication network, in which the asynchronous and synchronous mobile communication systems coexist and a handover cell having a preset size is placed at a boundary region between asynchronous and synchronous mobile communication system areas, the method comprising the first step of, as the mobile communication terminal using the service provided by the asynchronous mobile communication system moves into the synchronous area through the handover cell area, the asynchronous modem unit of the mobile communication terminal obtaining system information transmitted from a handover base station in the handover cell area, driving the synchronous modem unit of the mobile communication terminal, and requesting the asynchronous mobile communication system to perform handover, the second step of the mobile communication terminal driving the synchronous modem unit and changing to an idle state; the third step of the asynchronous modem unit of the mobile communication terminal transmitting a channel assignment message to the synchronous modem unit when a handover command has been received from the asynchronous mobile communication system; the fourth step of the mobile communication terminal turning off the asynchronous modem unit and switching a vocoder; and the fifth step of the synchronous modem unit achieving synchronization with the synchronous mobile communication system.

In addition, the present invention provides a mobile communication system, comprising a synchronous mobile communication network; an asynchronous mobile communication network overlapping with the synchronous mobile communication network; and a handover cell placed at a boundary between a synchronous mobile communication system and an asynchronous mobile communication system and provided with a handover base station for transmitting a signal having the same frequency as that used in the asynchronous mobile communication system, wherein the mobile communication system is operated in such a way that, as a multi-mode multi-band mobile communication terminal having an asynchronous modem unit and a synchronous modem unit passes through the handover cell area from an asynchronous mobile communication network area and then moves into a synchronous mobile communication network area, the mobile communication terminal receives a signal transmitted from the handover base station, thus performing handover.

Hereinafter, embodiments of the present invention will be described in detail with reference to the attached drawings. In the following description, "mobile communication terminals" means multi-mode multi-band mobile communication terminals capable of being used in both asynchronous and synchronous mobile communication systems. These mobile communication terminals are classified into a terminal capable of receiving signals from a synchronous mobile communication system using a synchronous modem unit during the use of service provided by an asynchronous mobile communication system, and a terminal capable of transmitting and receiving signals to and from a synchronous mobile communication system using a synchronous modem unit during the use of service provided by an asynchronous mobile communication system. A detailed description thereof will be provided later.

FIG. 1 is a view showing the configuration of a mobile communication network to which the present invention is applied.

The multi-mode multi-band mobile communication terminal 10 can be selectively and wirelessly connected to an asynchronous mobile communication system 20 and a synchronous mobile communication system 30 and uses voice and data services.

The asynchronous mobile communication system 20 includes a node B/Radio Network controller (RNC) 210 composed of a node B, that is, a base station for communicating with the mobile communication terminal 10 in a wireless region and a RNC for controlling the node B, an asynchronous Mobile Switching Center (MSC) 220 connected to the node B/RNC 210 to perform call switching so as to provide services to the mobile communication terminal 10, a Short Message Service Center (SMSC) 240 connected to the asynchronous MSC 220 through No. 7 common signaling network 230, a Service Control Point (SCP) 250, a Home Location Register (HLR) 260, a Serving GPRS Support Node (SGSN) 270 connected between the node B/RNC 210 and a General Packet Radio Service (GPRS) network 280 to maintain the location track of the mobile communication terminal 10 and to perform access control and a security function and a Gateway GPRS Support Node (GGSN) 290 connected to the SGSN 270 through the GPRS network 280 and connected to the No. 7 common signaling network 230, to support operation in conjunction with external packets through the Internet 40.

Furthermore, the synchronous mobile communication system 30 includes BTS/BSC 310 composed of a Base Transceiver System (BTS) for supporting communication with the mobile communication terminal 10 in a wireless region and a Base Station Controller (BSC) for controlling the BTS, a MSC 320 connected with one or more BSCs to perform call switching, an SMSC 340 connected to the MSC 320 through a No. 7 common signaling network 330, an SCP 350, an HLR 360, a Packet Data Service Node (PDSN) 370 connected to the BSC to provide subscribers with packet data services, and a Data Core Network (DCN) 380 for supporting connection between the PDSN 370 and the Internet 40.

The MSC 220 of the asynchronous mobile communication system 20 and the MSC 320 of the synchronous mobile communication system 30 are connected to each other via the No. 7 common signaling networks 230 and 330, and transmit and receive information required for handover of the mobile communication terminal 10. Furthermore, the HLRs 260 and 360 may be implemented using dual stack HLRs, and store and manage subscribers' information, the usage state of supplementary services, etc., and provide the subscribers' information according to the requests of the MSC 220 and 320.

In such a system environment, as a mobile communication terminal 10, performing voice communication in an asynchronous mobile communication system area, moves into a synchronous mobile communication system area, the mobile communication terminal 10 detects an asynchronous signal transmitted from a synchronous mobile communication system 30. If the asynchronous signal transmitted from the synchronous mobile communication system 30 increases above a preset threshold value, the mobile communication terminal starts to communicate with the synchronous mobile communication system. In this case, the asynchronous signal transmitted from the synchronous mobile communication system 30 may be transmitted using a base station of the synchronous mobile communication system placed at the boundary of the asynchronous mobile communication system area, or using a handover base station constructed in a handover cell that is additionally implemented at a boundary region between the asynchronous and synchronous mobile communication system areas.

Figure 2:
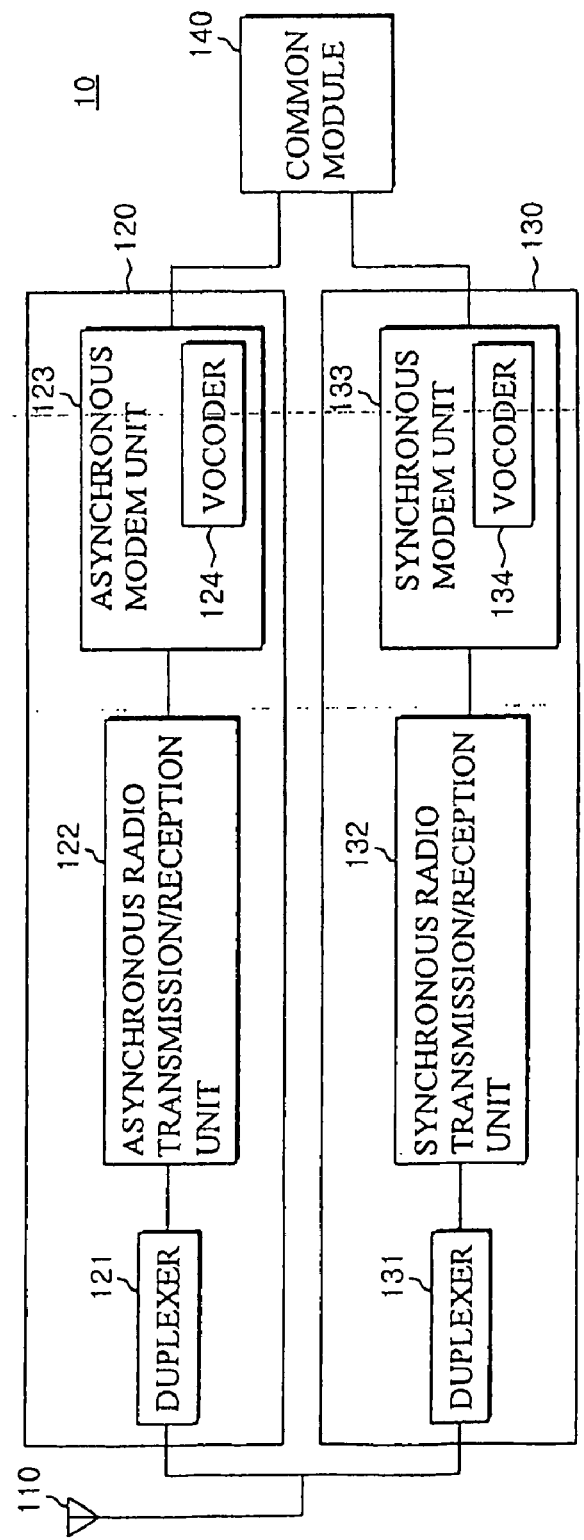
FIG. 2 is a view showing the construction of a mobile communication terminal applied to the present invention.

FIG. 2 is a view showing the construction of a mobile communication terminal applied to the present invention.

As shown in FIG. 2, a multi-mode multi-band mobile communication terminal 10 applied to the present invention includes an antenna 110, an asynchronous mobile communication service module 120, a synchronous mobile communication service module 130, and a common module 140. The antenna 110 is capable of simultaneously processing frequency bands for synchronous and asynchronous mobile communication services.

The asynchronous module 120 includes a duplexer 121 functioning as a band pass filter for separately processing individual frequencies, an asynchronous radio transmission/reception unit 122 for separating transmission/reception radio waves into preset frequency bands, an asynchronous modem unit 123 for processing the wireless section protocol of an asynchronous mobile communication system, and a vocoder 124 for performing encryption and decryption of voice signals. The synchronous module 130 includes a duplexer 131 functioning as a band pass filter for separately processing individual frequencies, a synchronous radio transmission/reception unit 132 for separating transmission/reception radio waves into preset frequency bands, a synchronous modem unit 133 for processing the wireless section protocol of a synchronous mobile communication system, and a vocoder 134 for performing encryption and decryption of voice signals.

The common module 140 includes an application processor that functions as a central processing unit for controlling the asynchronous modem unit 123 and the synchronous modem unit 133, an application processor for performing a multimedia function memory, an input/output unit, and some other application processing units.

Further, in the multi-mode multi-band mobile communication terminal 10, software used for a user interface, additional services, mobility management, connection/session control, resource control, and protocol processing is installed, thus allowing a user to use various application services, performing handover, and converting protocols according to mobile communication systems.

The above-described mobile communication terminals may be classified into a terminal capable of receiving signals from the synchronous mobile communication system during the use of service provided by the asynchronous mobile communication system, and a terminal capable of transmitting and receiving signals to and from the synchronous mobile communication system during the use of service provided by the asynchronous mobile communication system. In the case of the mobile communication terminal capable of transmitting and receiving signals to and from the synchronous mobile communication system during the use of service provided by the asynchronous mobile communication system, the configuration of components, Such as the duplexers 121 and 131, becomes somewhat complicated compared to the mobile communication terminal capable only of receiving signals. Accordingly, the components must be designed in consideration of the influence of signal interference, etc.

In the present invention, in order to control a multi-mode multi-band mobile communication terminal performing handover from an asynchronous mobile communication system area to a synchronous mobile communication system area, a signal having the same frequency as that used in the asynchronous area is transmitted to the mobile communication terminal that moves into the synchronous mobile communication system area. For this operation, there can be used a method of allowing a synchronous base station placed at the boundary of the asynchronous area to transmit a dummy pilot signal having the same frequency as an asynchronous signal, or a method of additionally constructing a handover cell area at the boundary region between the asynchronous and synchronous areas.

First, with reference to FIGS. 3 to 6, a method of controlling a mobile communication terminal by allowing a synchronous base station placed at the boundary of an asynchronous area to transmit a dummy pilot signal is described below.

Figure 3:
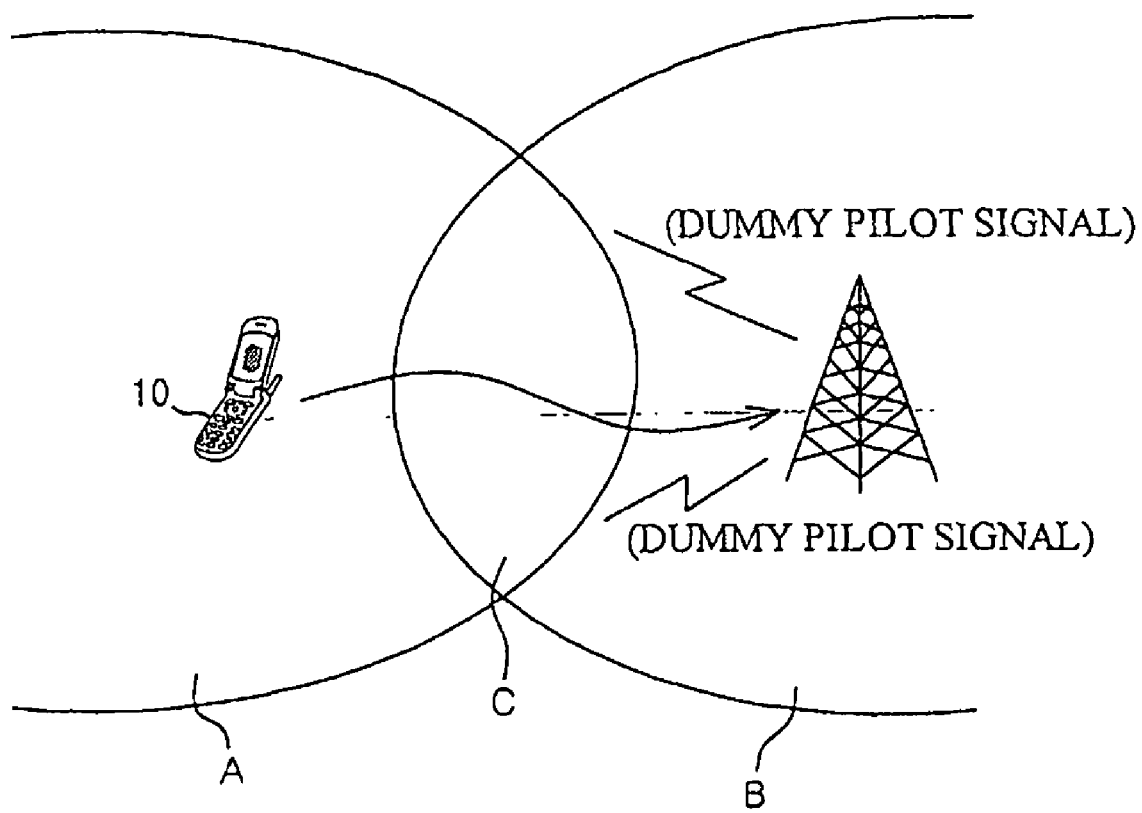
FIG. 3 is a view showing a method of controlling a mobile communication terminal using a dummy pilot signal in a mobile communication network in which asynchronous and synchronous networks coexist.

FIG. 3 is a view showing a method of controlling a mobile communication terminal using a dummy pilot signal in a mobile communication network in which asynchronous and synchronous networks coexist.

In a single mobile communication system, "handover" (or "handoff") means technology allowing a user to communicate without interruption when a mobile communication terminal moves from one cell of a mobile communication system to another cell thereof.

The present invention relates to a terminal control method for handover of a multi-mode multi-band mobile communication terminal in a network in which synchronous and asynchronous mobile communication systems coexist. Of the cases in which the mobile communication terminal 10 moves from a synchronous area B to an asynchronous area A, and in which the mobile communication terminal 10 moves from an asynchronous area A to a synchronous area B, the latter is described in detail.

As the mobile communication terminal 10 using the service of the asynchronous area A approaches the synchronous area B, the mobile communication terminal 10 receives a dummy pilot signal transmitted from a base station of the synchronous mobile communication system. Since the dummy pilot signal has the same frequency as that used in the asynchronous mobile communication system, the mobile communication terminal 10 having an activated asynchronous modem unit can easily detect a signal transmitted from the base station of the synchronous mobile communication system.

Figure 4:
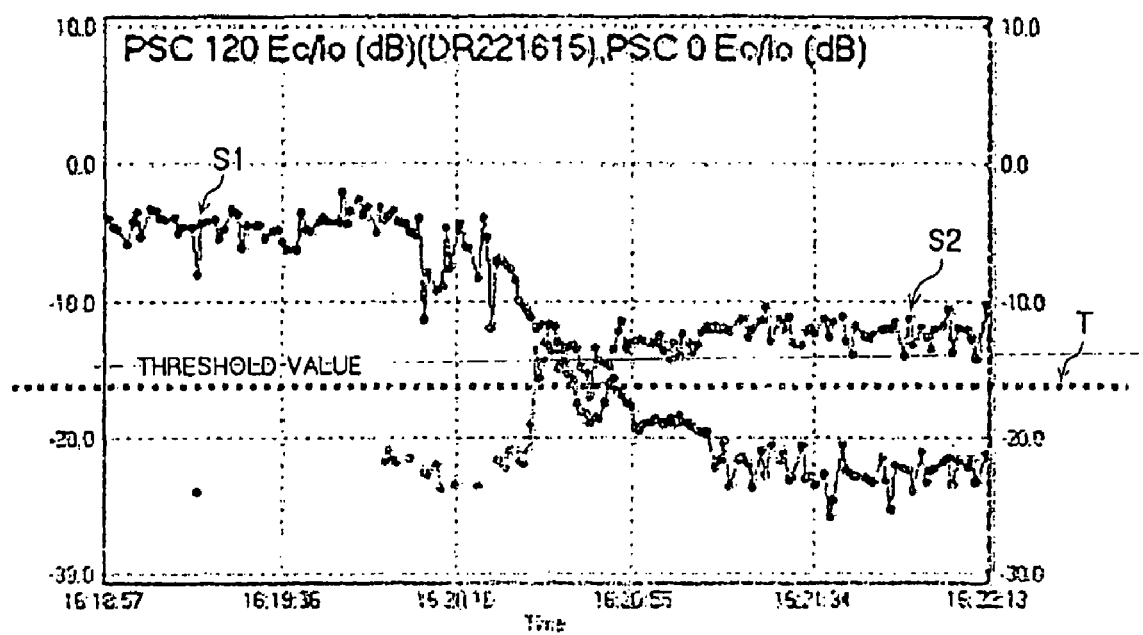
FIG. 4 is a graph showing variation in the intensity of a dummy pilot signal according to the movement of a mobile communication terminal.

FIG. 4 is a graph showing variation in the intensity of a dummy pilot signal according to the movement of a mobile communication terminal.

It can be seen that, as the mobile communication terminal moves into the synchronous area, the intensity of a signal S1 received from the asynchronous mobile communication system gradually decreases, and the intensity of a dummy pilot signal S2 received from the base station of the synchronous mobile communication system gradually increases. In this way, if the intensity of the dummy pilot signal S2 gradually increases above a preset threshold value T, the mobile communication terminal turns on the synchronous modem unit to communicate with the synchronous mobile communication system.

After turning on the synchronous modem unit, the mobile communication terminal searches for a base station of the synchronous mobile communication system, and notifies the asynchronous mobile communication system of results of a search for the base station through the asynchronous modem. Thereafter, a procedure for interfacing with the synchronous mobile communication system is performed in response to a handover command from the asynchronous mobile communication system. This procedure can be separated into two operations and described thereby according to the type of mobile communication terminals. That is, mobile communication terminals to perform handover can be differently controlled depending on whether a mobile communication terminal is a terminal capable of receiving signals from the synchronous mobile communication system during the use of service provided by the asynchronous mobile communication system, or a terminal capable of transmitting and receiving signals to and from the synchronous mobile communication system during the use of service provided by the asynchronous mobile communication system.

Figure 5:
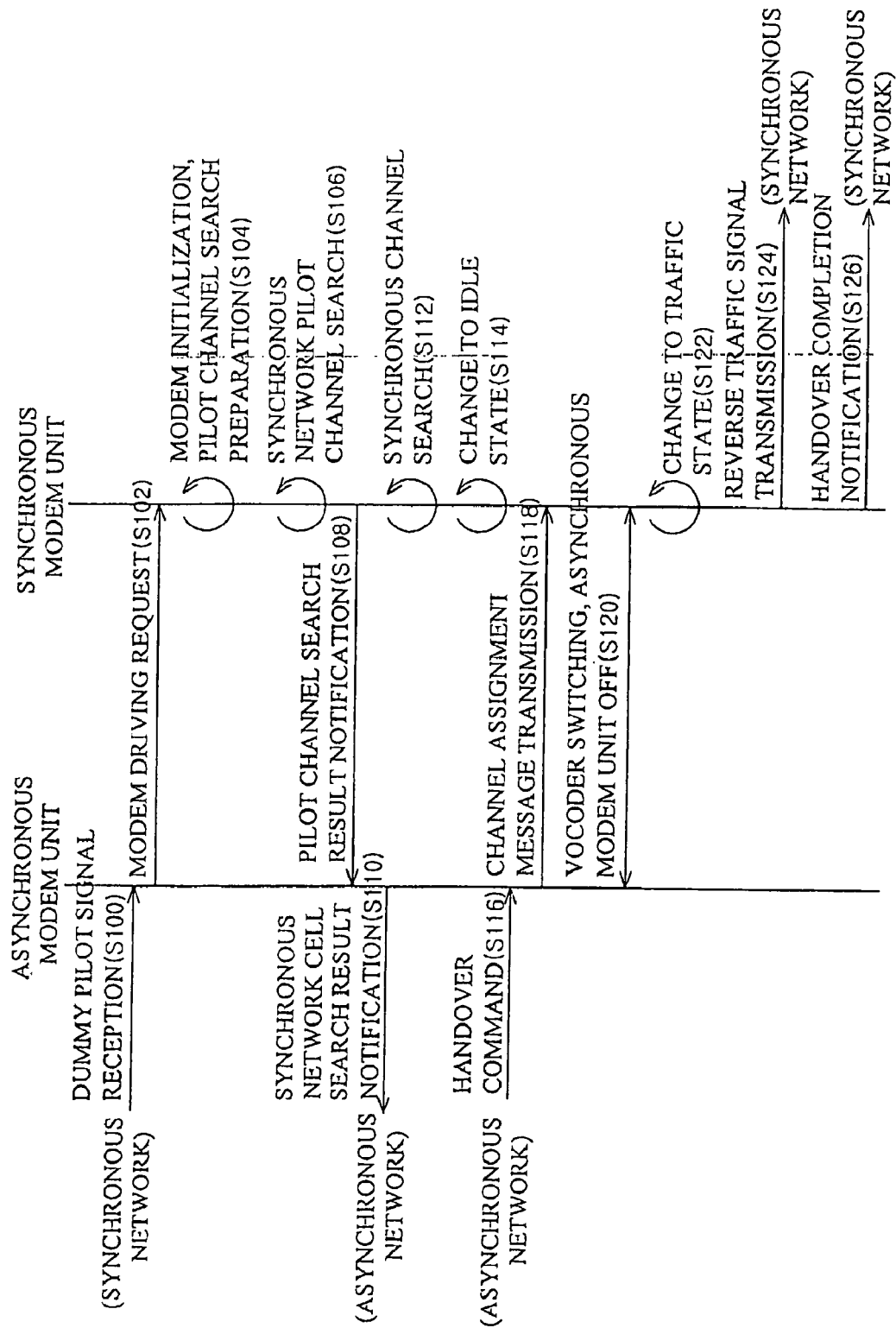
FIG. 5 is a flowchart of a method of controlling a mobile communication terminal according to a first embodiment of the present invention.

FIG. 5 is a flowchart of a method of controlling a mobile communication terminal according to a first embodiment of the present invention, which shows a method of controlling a mobile communication terminal using a dummy pilot signal in the case where the mobile communication terminal can receive signals from a synchronous mobile communication system during the use of service provided by an asynchronous mobile communication system.

As the mobile communication terminal, using service provided by the asynchronous mobile communication system, moves into a synchronous area, the asynchronous modem unit of the mobile communication terminal receives a dummy pilot signal from the synchronous mobile communication system at step S100. In this case, since the dummy pilot signal has the same frequency as the signal used in the asynchronous mobile communication system, the asynchronous modem unit of the mobile communication terminal can easily detect the dummy pilot signal.

The asynchronous modem unit of the mobile communication terminal, having received the dummy pilot signal, transmits a message requesting the driving of a synchronous modem to the synchronous modem unit at step S102. Accordingly, the synchronous modem unit performs an initialization procedure for the synchronous modem, and prepares to search for a pilot channel of the synchronous mobile communication system at step S104. After the synchronous modem unit searches for the pilot channel of the synchronous mobile communication system at step S106, the synchronous modem unit notifies the asynchronous modem unit of results of a search for the pilot channel, that is, search results for a cell of the synchronous mobile communication system in which to perform handover, at step S108.

Accordingly, the asynchronous modem unit traits the search results for the cell of the synchronous mobile communication system to the asynchronous mobile communication system at step S110. The asynchronous mobile communication system, having received the cell search results, determines whether to perform handover and determine a cell in which to perform the handover on the basis of the cell search results. In the meantime, the synchronous modem unit searches for a synchronous channel of the synchronous mobile communication system at step S112, and changes to an idle state at step S114.

Thereafter, the asynchronous mobile communication system commands the asynchronous modem unit of the mobile communication terminal to perform handover at step S116, and the asynchronous modem unit transmits a channel assignment message to the synchronous modem unit at step S118. In this case, the channel assignment message includes parameters required to change the synchronous modem unit from an idle state to a traffic state.

After receiving the channel assignment message, the synchronous modem unit switches the vocoder and turns off the asynchronous modem unit at step S120, and changes to the traffic state at step S122. Next, the synchronous modem unit transmits reverse traffic signal to synchronize with the synchronous mobile communication system, at step S124, and notifies the base station of the synchronous mobile communication system that the handover has been completed at step S126.

The mobile communication terminal applied to this embodiment is capable only of receiving signals from the synchronous mobile communication system during the use of service provided by the asynchronous mobile communication system. Therefore, the synchronous modem unit must transmit reverse traffic signal after the asynchronous modem unit is turned off.

Figure 6:
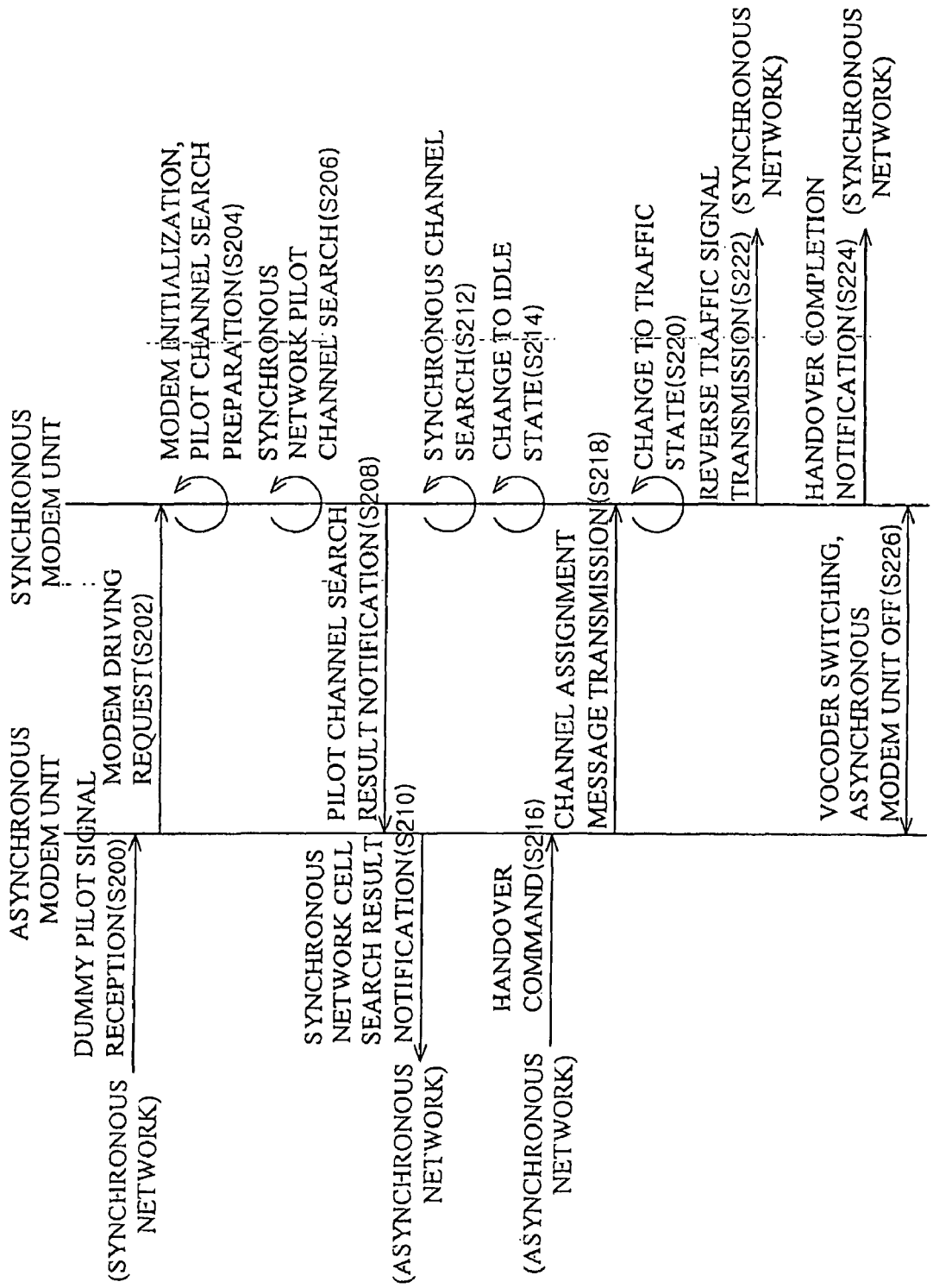
FIG. 6 is a flowchart of a method of controlling a mobile communication terminal according to a second embodiment of the present invention.

FIG. 6 is a flowchart of a method of controlling a mobile communication terminal according to a second embodiment of the present invention, which shows a method of controlling a mobile communication terminal using a dummy pilot signal in the case where the mobile communication terminal can transmit and receive signals to and from the synchronous mobile communication system during the use of service provided by the asynchronous mobile communication system.

In this embodiment, procedures starting from a procedure of allowing the asynchronous modem unit to receive the dummy pilot signal and driving the synchronous modem unit to a procedure of allowing the asynchronous mobile communication system to transmit a handover command to the asynchronous modem unit and allowing the asynchronous modem unit to transmit a channel assignment message to the synchronous modem unit are the same as in the case of the mobile communication terminal control method described in FIG. 5.

That is, as the mobile communication terminal using the service provided by the asynchronous mobile communication system moves into a synchronous area, the asynchronous modem unit of the mobile communication terminal receives a dummy pilot signal from the synchronous mobile communication system at step S200, and requests the synchronous modem unit to drive a synchronous modem at step S202.

Accordingly, the synchronous modem unit performs an initialization procedure for the synchronous modem and prepares to search for a pilot channel of the synchronous mobile communication system at step S204, searches for the pilot channel of the synchronous mobile communication system at step S206, and notifies the asynchronous modem unit of results of a search for a cell of the synchronous mobile communication system in which to perform the handover at step S208.

Thereafter, as the asynchronous modem unit transmits the search results for the cell of the synchronous mobile communication system to the asynchronous mobile communication system at step S210, the asynchronous mobile communication system determines whether to perform handover and determine a cell in which to perform the handover on the basis of the cell search results. In the meantime, the synchronous modem unit searches for a synchronous channel of the synchronous mobile communication system at step S212, and changes to an idle state at step S214. If the asynchronous mobile communication system commands the asynchronous modem unit to perform handover at step S216, the asynchronous modem unit transmits a channel assignment message to the synchronous modem unit at step S218.

Next, the synchronous modem unit changes to a traffic state at step S220, and transmits reverse traffic signal to synchronize with the synchronous mobile communication system at step S222. Next, the synchronous modem unit notifies the base station of the synchronous mobile communication system that the handover has been completed at step S224, switches the vocoder and turns off the asynchronous modem at step S226.

The mobile communication terminal applied to this embodiment has the function of transmitting signals to the synchronous mobile communication system during the use of service provided by the asynchronous mobile communication system. Therefore, the mobile communication terminal must transmit reverse traffic signal to the synchronous mobile communication system before the asynchronous modem unit is turned off, thus synchronizing with the synchronous mobile communication system. Further, the mobile communication terminal can provide service improved over the mobile communication terminal capable only of receiving signals from the synchronous mobile communication system during the use of the asynchronous mobile communication service. That is, since the mobile communication terminal capable only of receiving signals from the synchronous mobile communication system during the use of the asynchronous mobile communication service synchronizes with the synchronous mobile communication system after turning off the asynchronous modem unit, the time during which the synchronization is performed is a mute interval, thus deteriorating sound quality. In contrast since the mobile communication terminal capable of transmitting and receiving signals to and from the synchronous mobile communication system during the use of the asynchronous mobile communication service turns off the asynchronous modem after synchronizing with the synchronous mobile communication system, a mute interval is rarely generated. Next, with reference to FIGS. 7 to FIG. 9, a method of constructing a handover cell at the boundary region between asynchronous and synchronous areas and controlling a mobile communication terminal using the handover cell is described.

For this embodiment, a handover cell area C must be additionally constructed at the boundary region between an asynchronous area A and a synchronous area B, and the handover cell includes a handover base station 410. The handover base station 410 transmits a signal, indicating that the mobile communication terminal is currently located in the handover cell, to another mobile communication terminal located at the handover cell area This signal includes system information, and is transmitted at the same frequency as that used in the asynchronous mobile communication system.

Such a system information transmission signal includes specific scramble codes to distinguish different cells (an asynchronous cell and a synchronous cell) from each other. Preferably, 512 scramble codes are used. Further, the length of the landover cell area, that is, the distance between the boundaries of the asynchronous and synchronous areas, is preferably calculated and constructed by the following Equation [1] in consideration of the moving speed of the mobile communication terminal, $$S_{HOCELL} = v_{MS} * T_{HO} \qquad [1]$$

In this case, $S_{HOCELL}$ is the size of the cell, that is, the distance between the asynchronous and synchronous areas, $V_{MS}$ is the moving speed of the mobile communication terminal, and $T_{HO}$ is the time required for handover, which can be set to, for example, 10 to 20 seconds.

In this system environment, as the mobile communication terminal 10 in the asynchronous mobile communication system area moves into the synchronous mobile communication system area, the mobile communication terminal 10 receives a signal transmitted from the handover base station in the handover cell area and drives the synchronous modem unit according to the signal. In addition, the mobile communication terminal 10 requests the asynchronous mobile communication system to perform handover, thus interfacing with the synchronous mobile communication system.

Furthermore, the handover cell accepts calls only with respect to mobile communication terminals performing handover from the asynchronous network to the synchronous network, restricts outgoing and incoming calls to and from the asynchronous mobile communication system and accepts outgoing and incoming calls to and from the synchronous mobile communication system within the handover cell, thus preventing speech quality from deteriorating.

Figure 7:
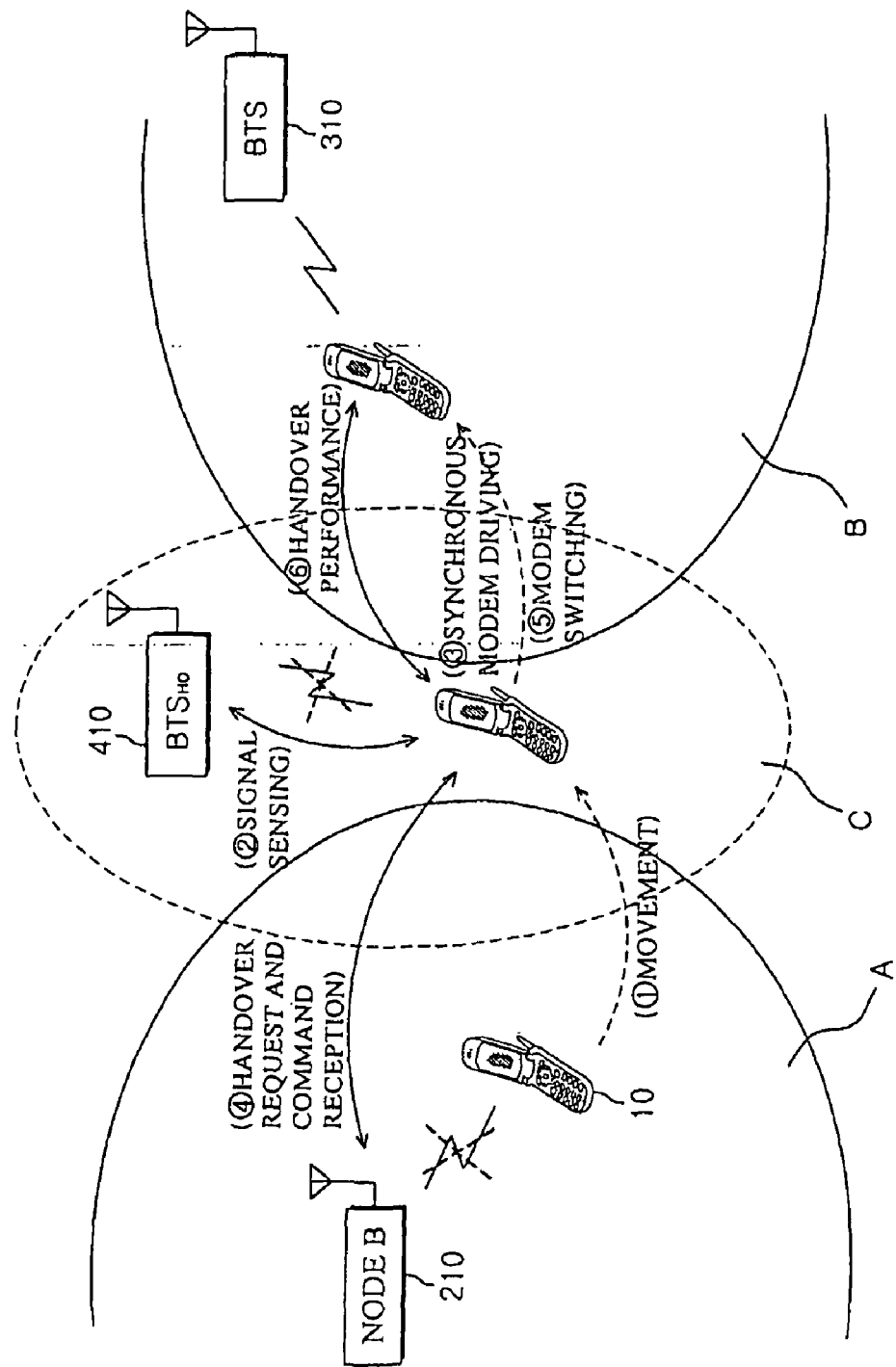
FIG. 7 is a view showing a method of controlling a mobile communication terminal using a handover cell in a mobile communication network in which asynchronous and synchronous networks coexist.

FIG. 7 is a view showing a method of controlling a mobile communication terminal using a handover cell in a mobile communication network in which asynchronous and synchronous networks coexist.

As the mobile communication terminal 10 using a service of an asynchronous area A moves into a synchronous area B, the mobile communication terminal 10 receives a signal transmitted from a handover cell area C. The signal transmitted from the base station $BTS_{HO}$ 410 of the handover cell area C includes system information indicating that the mobile communication terminal 10 is currently located in the handover cell area C. The mobile communication terminal, having received the signal, requests the asynchronous mobile communication system 20 to perform handover while driving the synchronous modem unit. The asynchronous mobile communication system 20 having received the handover request must transmit handover command.

As described above, the asynchronous mobile communication system 20 unconditionally commands the handover in response to the request from the mobile communication terminal 10, thus preventing a ping-pong phenomenon from occurring at the boundary region between the asynchronous and synchronous networks. Ping-pong means a phenomenon in which, as the intensity of power frequently varies at the boundary region between cells, handover is repeatedly performed.

The mobile communication terminal 10 switches a modem and a vocoder and performs handover together with the synchronous mobile communication system 30 in response to the handover command from the asynchronous mobile communication system 20. The process of switching the modem and the vocoder can be performed after the handover with the synchronous mobile communication system 30 has been completed according to the type of mobile communication terminal 10 (in the case of a mobile communication terminal capable of transmitting and receiving signals to and from the synchronous mobile communication system during the use of the asynchronous mobile communication service).

Figure 8:
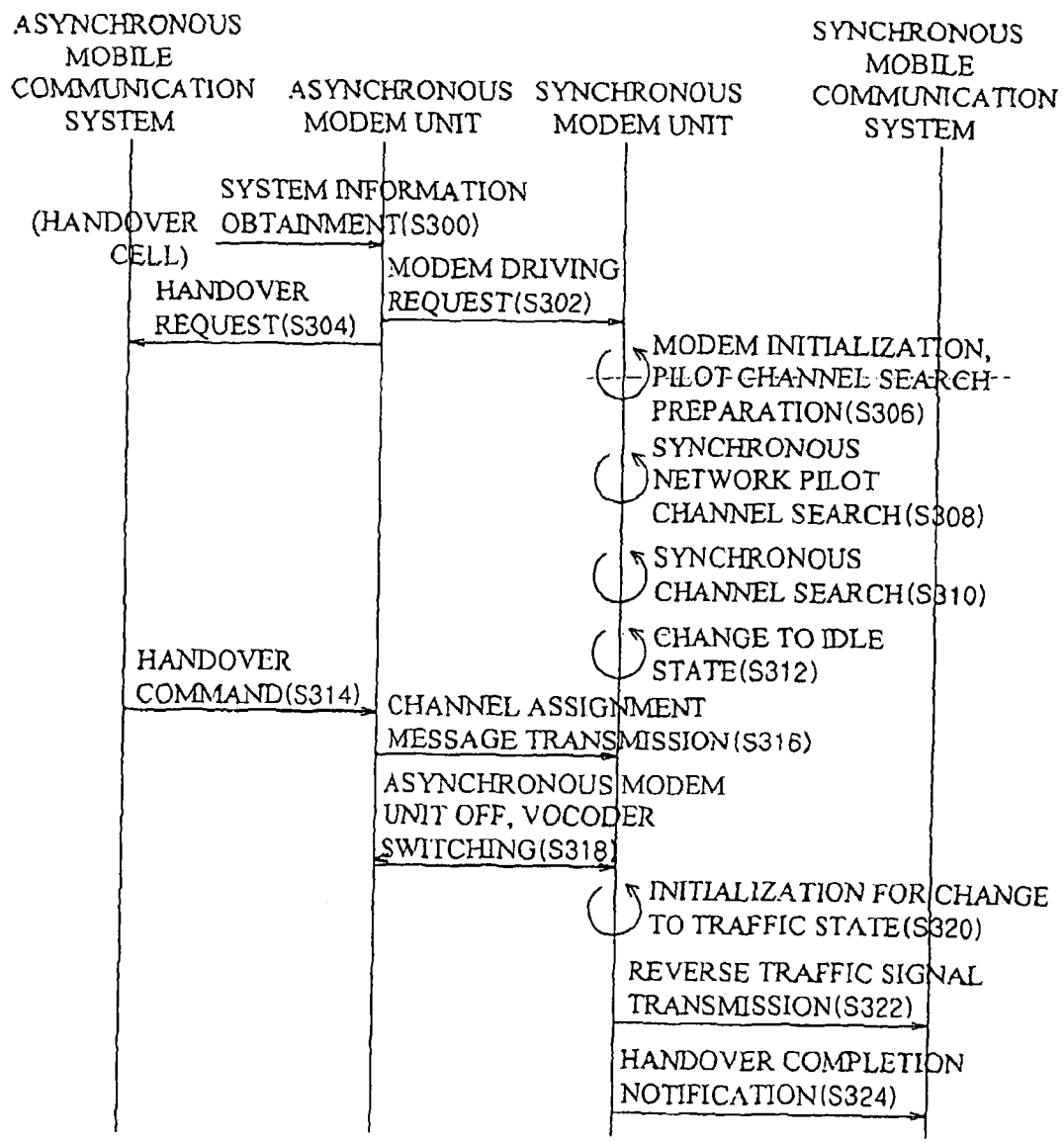
FIG. 8 is a flowchart of a method of controlling a mobile communication terminal according to a third embodiment of the present invention.

FIG. 8 is a flowchart of a method of controlling a mobile communication terminal according to a third embodiment of the present invention, which shows a method of controlling a mobile communication terminal using a handover cell in the case where the mobile communication terminal is capable only of receiving signals from a synchronous mobile communication system during the use of service provided by an asynchronous mobile communication system.

As the mobile communication terminal using the service provided by the asynchronous mobile communication system moves from an asynchronous area to a synchronous area through the handover cell area, the asynchronous modem unit of the mobile communication terminal receives a message, including system information indicating that the mobile communication terminal is currently located in the handover cell area, from the base station in the handover cell area at step S300. In this case, the signal including the system information uses the same frequency as that used in the asynchronous mobile communication system.

The asynchronous modem unit of the mobile communication terminal having received the system information from the base station in the handover cell area transmits a message requesting the driving of a synchronous modem to the synchronous modem unit at step S302, and transmits a message requesting handover to the asynchronous mobile communication system at step S304. The synchronous modem unit of the mobile communication terminal performs an initialization procedure for the synchronous modem, prepares to search for a pilot channel of the synchronous mobile communication system at step S306, searches for the pilot channel and a synchronous channel of the synchronous mobile communication system at steps S308 and S310, and changes to an idle state at step S312.

Thereafter, the asynchronous modem unit receives a handover command from the asynchronous mobile communication system at step S314, and transmits a channel assignment message to the synchronous modem unit at step S316. In this case, the channel assignment message includes parameters required to change the synchronous modem unit from an idle state to a traffic state. After receiving the channel assignment message, the synchronous modem unit turns off the asynchronous modem unit, and switches the vocoder by turning off an asynchronous vocoder and driving a synchronous vocoder at step S318. The synchronous modem unit changes to a traffic state at step S320. Next, the synchronous modem unit transmits reverse traffic signal to synchronize with the synchronous mobile communication system at step S322, and notifies the base station of the synchronous mobile communication system that the handover has been completed at step S324.

The mobile communication terminal applied to this embodiment is a terminal capable only of receiving signals from the synchronous mobile communication system during the use of service provided by the asynchronous mobile communication system. Therefore, the synchronous modem unit must transmit reverse traffic signal after the asynchronous modem unit is turned off.

Figure 9:
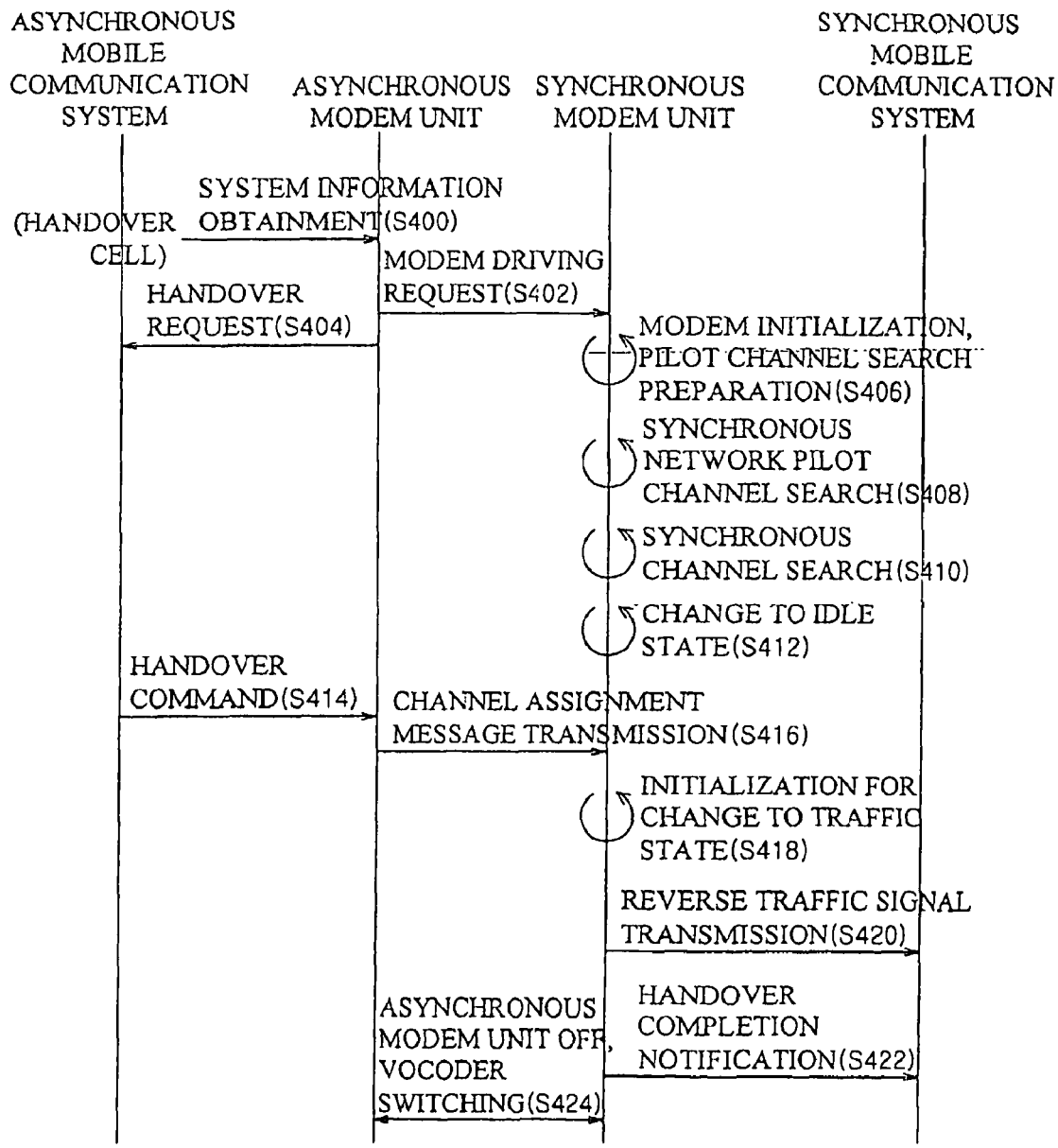
FIG. 9 is a flowchart of a method of controlling a mobile communication terminal according to a fourth embodiment of the present invention.

FIG. 9 is a method of controlling a mobile communication terminal according to a fourth embodiment of the present invention, which shows a method of controlling a mobile communication terminal using a handover cell in the case where the mobile communication terminal is capable of transmitting and receiving signals to and from a synchronous mobile communication system during the use of service provided by an asynchronous mobile communication system.

In this embodiment, the process of allowing the asynchronous modem unit to obtain system information from the base station in a handover cell area, transmit a synchronous modem unit driving command, transmit a handover command to the asynchronous mobile communication system and receive a handover command from the asynchronous mobile communication system when the synchronous modem unit is driven, and allowing the asynchronous modem unit to transmit a channel assignment message, is the same as that of FIG. 8.

That is, as the mobile communication terminal using service provided by the asynchronous mobile communication system moves into a synchronous area through the handover cell area, the asynchronous modem unit of the mobile communication terminal obtains system information from the base station in the handover cell area at step S400. The asynchronous modem unit requests the synchronous modem unit to drive a synchronous modem at step S402, and requests the asynchronous mobile communication system to perform handover at step S404. In this case, the signal including the system information uses the same frequency as that used in the asynchronous mobile communication system.

Accordingly, the synchronous modem unit performs an initialization procedure for the synchronous modem and prepares to search for a pilot channel of the synchronous mobile communication system at step S406, searches for the pilot channel and a synchronous channel of the synchronous mobile communication system at steps S408 and S410, and changes to an idle state at step S412. Thereafter, if the asynchronous mobile communication system commands the asynchronous modem unit to perform handover at step S414, the asynchronous modem unit transmits a channel assignment message to the synchronous modem unit at step S416.

Next, the synchronous modem unit changes to a traffic state at step S418, and transmits reverse traffic signal to synchronize with the synchronous mobile communication system at step S420. Then, the synchronous modem unit notifies the base station of the synchronous mobile communication system that the handover has been completed at step S422, turns off the asynchronous modem, and switches the vocoder by turning off the asynchronous vocoder and driving the synchronous vocoder at step S424.

Since the mobile communication terminal applied to this embodiment has the function of transmitting signals to the synchronous mobile communication system during the use of service provided by the asynchronous mobile communication system, the mobile communication terminal transmits the reverse traffic signal to the synchronous mobile communication system before the asynchronous modem unit is turned off, thus synchronizing with the synchronous mobile communication system. This embodiment can provide service improved over the mobile communication terminal capable only of receiving signals from the synchronous mobile communication system during the use of the asynchronous mobile communication service. That is, since the mobile communication terminal capable of receiving signals from the synchronous mobile communication system during the use of the asynchronous mobile communication service synchronizes with the synchronous mobile communication system after turning off the asynchronous modem unit, the time during which synchronization is performed is a mute interval, thus deteriorating sound quality. In contrast, since the mobile communication terminal capable of transmitting and receiving signals to and from the synchronous mobile communication system during the use of the asynchronous mobile communication service turns off the asynchronous modem after synchronizing with the synchronous mobile communication system, a mute interval is rarely generated.

As described above, those skilled in the art will appreciate that the present invention can be implemented with other embodiments without changing the technical spirit or essential features thereof. Therefore, the above-described embodiments should be appreciated as having been disclosed for illustrative purposes and are not restrictive. Those skilled in the art will appreciate that the scope of the present invention is defined by the accompanying claims rather than the above detailed description, and various modifications, additions and substitutions, derived from the meaning and scope of the claims and equivalent concepts thereof, belong to the scope of the present invention.

INDUSTRIAL APPLICABILITY

As described above, the present invention facilitates a search for a cell of a synchronous mobile communication system and the activation of a synchronous modem unit using a dummy pilot signal in a mobile communication network in which asynchronous and synchronous mobile communication systems coexist, so that the interruption of communication can be prevented at the time of handover, and continuous service can be provided, thus improving a service quality.

Further, the present invention can construct a handover cell area having a preset size at the boundary region between asynchronous and synchronous areas, and performs handover by activating the synchronous modem unit using a system information message that has been received from a base station in the handover cell area when the mobile communication terminal enters the handover cell area, thus enabling the mobile communication terminal to have a temporal margin sufficient to move from the asynchronous area to the synchronous area.

As described above, the mobile communication terminal performs handover with a sufficient temporal margin while moving from the asynchronous area to the synchronous area, thus preventing the occurrence of a phenomenon in which an asynchronous modem is turned off before a synchronous modem is driven, or a phenomenon in which synchronous and asynchronous modems are simultaneously driven and battery power is unnecessarily consumed.

The invention claimed is:

1. A method of controlling a multi-mode multi-band mobile communication terminal for handover, the multi-mode multi-band mobile communication terminal being provided with an asynchronous modem unit and a synchronous modem unit and being configured to receive signals from a synchronous mobile communication system during use of service provided by an asynchronous mobile communication system in a mobile communication network in which the asynchronous and synchronous mobile communication systems coexist, the method comprising:

a first step of, as the multi-mode multi-band mobile communication terminal using the service provided by the asynchronous mobile communication system moves into a synchronous area, the asynchronous modem unit of the multi-mode multi-band mobile communication terminal receiving a dummy pilot signal from the synchronous mobile communication system wherein the dummy pilot signal has the same frequency as that used in the asynchronous mobile communication system, driving the synchronous modem unit of the multi-mode multi-band mobile communication terminal, searching for a cell in which to perform a handover, notifying the asynchronous mobile communication system of results of the search for the cell in which to perform the handover, and transmitting a channel assignment message to the synchronous modem unit when a handover command has been received from the asynchronous mobile communication system;

a second step of switching a vocoder and turning off the asynchronous modem unit; and a third step of the synchronous modem unit achieving synchronization with the synchronous mobile communication system, the third step comprising steps of:
  the synchronous modem unit changing to a traffic state;
  the synchronous modem unit transmitting a reverse traffic signal to a base station of the synchronous mobile communication system; and
  the synchronous modem unit notifying the synchronous mobile communication system that the handover has been completed.

2. The method of controlling the multi-mode multi-band mobile communication terminal for handover according to claim 1, wherein the first step comprises steps of:

the asynchronous modem unit receiving the dummy pilot signal from the base station of the synchronous mobile communication system;

the asynchronous modem unit requesting the synchronous modem unit to drive a synchronous modem;

the synchronous modem unit performing an initialization procedure for the synchronous modem, and searching for a pilot channel of the synchronous mobile communication system;

the synchronous modem unit notifying the asynchronous modem unit of results of the search for the pilot channel, which are the search results for a cell of the synchronous mobile communication system;

the asynchronous modem unit transmitting the search results for the cell of the synchronous mobile communication system to the asynchronous mobile communication system;

the synchronous modem unit searching for a synchronous channel of the synchronous mobile communication system and changing to an idle state; and the asynchronous modem unit transmitting the channel assignment message to the synchronous modem unit as the asynchronous mobile communication system commands the asynchronous modem unit to perform the handover.

3. A method of controlling a multi-mode multi-band mobile communication terminal for handover, the multi-mode multi-band mobile communication terminal being provided with an asynchronous modem unit and a synchronous modem unit and being configured to transmit and receive signals to and from a synchronous mobile communication system during use of service provided by an asynchronous mobile communication system in a mobile communication network in which the asynchronous and synchronous mobile communication systems coexist, the method comprising:

a first step of, as the multi-mode multi-band mobile communication terminal using the service provided by the asynchronous mobile communication system moves into a synchronous area, the asynchronous modem unit of the multi-mode multi-band mobile communication terminal receiving a dummy pilot signal from the synchronous mobile communication system wherein the dummy pilot signal has the same frequency as that used in the asynchronous mobile communication system, driving the synchronous modem unit of the multi-mode multi-band mobile communication terminal, searching for a cell in which to perform a handover, notifying the asynchronous mobile communication system of results of the search for the cell in which to perform the handover, and transmitting a channel assignment message to the synchronous modem unit when a handover command has been received from the asynchronous mobile communication system;

a second step of the synchronous modem unit achieving synchronization with the synchronous mobile communication system, the second step comprising steps of:
the synchronous modem unit changing to a traffic state;
the synchronous modem unit transmitting a reverse traffic signal to a base station of the synchronous mobile communication system; and
the synchronous modem unit notifying the synchronous mobile communication system that handover has been completed; and a third step of switching a vocoder and turning off the asynchronous modem unit.

4. The method of controlling the multi-mode multi-band mobile communication terminal for handover according to claim 3, wherein the first step comprises the steps of:
the asynchronous modem unit receiving the dummy pilot signal from the base station of the synchronous mobile communication system;
the asynchronous modem unit requesting the synchronous modem unit to drive a synchronous modem;
the synchronous modem unit performing an initialization procedure for the synchronous modem, and searching for a pilot channel of the synchronous mobile communication system;
the synchronous modem unit notifying the asynchronous modem unit of results of a search for a pilot channel, which are the search results for the cell of the synchronous mobile communication system;
the asynchronous modem unit transmitting the search results for the cell of the synchronous mobile communication system to the asynchronous mobile communication system;
the synchronous modem unit searching for a synchronous channel of the synchronous mobile communication system and changing to an idle state; and
the asynchronous modem unit transmitting the channel assignment message to the synchronous modem unit as the asynchronous mobile communication system commands the asynchronous modem unit to perform handover.

5. A method of controlling a multi-mode multi-band mobile communication terminal for handover, the multi-mode multi-band mobile communication terminal being provided with an asynchronous modem unit and a synchronous modem unit and being configured to receive signals from a synchronous mobile communication system during use of service provided by an asynchronous mobile communication system in a mobile communication network, in which the asynchronous and synchronous mobile communication systems coexist and a handover cell area having a preset size is placed at a boundary region between asynchronous and synchronous mobile communication system areas, the method comprising:

a first step of, as the multi-mode multi-band mobile communication terminal using the service provided by the asynchronous mobile communication system moves into the synchronous mobile communication system area through the handover cell area, the asynchronous modem unit of the multi-mode multi-band mobile communication terminal obtaining system information transmitted from a handover base station in the handover cell area wherein the system information obtained by the multi-mode multi-band mobile communication terminal from the handover base station has the same frequency as that used in the asynchronous mobile communication system, driving the synchronous modem unit of the multi-mode multi-band mobile communication terminal, and requesting the asynchronous mobile communication system to perform a handover;

a second step of the multi-mode multi-band mobile communication terminal driving the synchronous modem unit and changing to an idle state;

a third step of the asynchronous modem unit of the multi-mode multi-band mobile communication terminal transmitting a channel assignment message to the synchronous modem unit when a handover command has been received from the asynchronous mobile communication system;

a fourth step of the multi-mode multi-band mobile communication terminal turning off the asynchronous modem unit and switching a vocoder; and a fifth step of the synchronous modem unit achieving synchronization with the synchronous mobile communication system, the fifth step comprising steps of:
the synchronous modem unit changing to a traffic state;
the synchronous modem unit transmitting a reverse traffic signal to a base station of the synchronous mobile communication system; and
the synchronous modem unit notifying the synchronous mobile communication system that the handover has been completed.

6. The method of controlling the multi-mode multi-band mobile communication terminal for handover according to claim 5, wherein the second step comprises steps of:
the synchronous modem unit performing an initialization procedure for the synchronous modem and preparing to search for a pilot channel of the synchronous mobile communication system;
the synchronous modem unit searching for the pilot channel and a synchronous channel of the synchronous mobile communication system; and
the synchronous modem unit changing to an idle state.

7. The method of controlling the multi-mode multi-band mobile communication terminal for handover according to claim 5, wherein the handover cell area has a size of $S_{HOCELL}=V_{MS}*T_{HO}$, where $S_{HOCELL}$ is the size of the handover cell, $V_{MS}$ is a moving speed of the mobile communication terminal, and $T_{HO}$ is a time required for the handover.

8. A method of controlling a multi-mode multi-band mobile communication terminal for handover, the multi-mode multi-band mobile communication terminal being provided with an asynchronous modem unit and a synchronous modem unit and being configured to receive signals from a synchronous mobile communication system during use of service provided by an asynchronous mobile communication system in a mobile communication network, in which the asynchronous and synchronous mobile communication systems coexist and a handover cell area having a preset size is placed at a boundary region between asynchronous and synchronous mobile communication system areas, the multi-mode multi-band mobile communication terminal being capable of configured to transmit and receive signals to and from the synchronous mobile communication system during use of service provided by the asynchronous mobile communication system, the method comprising:

a first step of, as the multi-mode multi-band mobile communication terminal using the service provided by the asynchronous mobile communication system moves into the synchronous mobile communication system area through the handover cell area, the asynchronous modem unit of the multi-mode multi-band mobile communication terminal obtaining system information transmitted from a handover base station in the handover cell area wherein the system information obtained by the multi-mode multi-band mobile communication terminal from the handover base station has the same frequency as that used in the asynchronous mobile communication system, driving the synchronous modem unit of the multi-mode multi-band mobile communication terminal, and requesting the asynchronous mobile communication system to perform a handover;

a second step of the multi-mode multi-band mobile communication terminal driving the synchronous modem unit and changing to an idle state;

a third step of the asynchronous modem unit of the multi-mode multi-band mobile communication terminal transmitting a channel assignment message to the synchronous modem unit when a handover command has been received from the asynchronous mobile communication system;

a fourth step of the synchronous modem unit achieving synchronization with the synchronous mobile communication system, the fourth step comprising steps of:
the synchronous modem unit changing to a traffic state;
the synchronous modem unit transmitting a reverse traffic signal to a base station of the synchronous mobile communication system; and
the synchronous modem unit notifying the synchronous mobile communication system that the handover has been completed; and a fifth step of the multi-mode multi-band mobile communication terminal turning off the asynchronous modem unit and switching a vocoder.

9. The method of controlling the multi-mode multi-band mobile communication terminal for handover according to claim 8, wherein the second step comprises steps of:
the synchronous modem unit performing an initialization procedure for the synchronous modem and preparing to search for a pilot channel of the synchronous mobile communication system;
the synchronous modem unit searching for the pilot channel and a synchronous channel of the synchronous mobile communication system; and
the synchronous modem unit changing to an idle state.

10. The method of controlling the multi-mode multi-band mobile communication terminal for handover according to claim 8, wherein the handover cell area has a size of $S_{HOCELL}=V_{MS}*T_{HO}$, where $S_{HOCELL}$ is the size of the handover cell, $V_{MS}$ is a moving speed of the mobile communication terminal, and $T_{HO}$ is a time required for the handover.

11. A mobile communication system, comprising:
a synchronous mobile communication network;
an asynchronous mobile communication network overlapping with the synchronous mobile communication network; and
a handover cell area placed at a boundary between a synchronous mobile communication system and an asynchronous mobile communication system and provided with a handover base station for transmitting a signal having the same frequency as that used in the asynchronous mobile communication system,
wherein the mobile communication system is operated in such a way that, as a multi-mode multi-band mobile communication terminal having an asynchronous modem unit and a synchronous modem unit passes through the handover cell area from an asynchronous mobile communication network area and then moves into a synchronous mobile communication network area, the multi-mode multi-band mobile communication terminal receives a signal transmitted from the handover base station, thus performing handover, and
wherein the handover cell area has a size of $S_{HOCELL}=V_{MS}*T_{HO}$, where $S_{HOCELL}$ is the size of the handover cell, $V_{MS}$ is a moving speed of the mobile communication terminal, and $T_{HO}$ is a time required for the handover.

12. The mobile communication system according to claim 11, wherein the signal transmitted from the handover base station includes scramble codes indicating information about a cell in which the mobile communication terminal is located.

* * * * *